United States Patent [19]

Wallis

[11] Patent Number: 4,953,378

[45] Date of Patent: Sep. 4, 1990

[54] APPARATUS FOR CUTTING CORRUGATED STRIP STOCK AT VARIABLE LENGTHS

[76] Inventor: Bernard J. Wallis, 2215 Dacosta, Dearborn, Mich. 48128

[21] Appl. No.: 296,681

[22] Filed: Jan. 13, 1989

[51] Int. Cl.⁵ .............................................. B21D 53/02
[52] U.S. Cl. ...................................... 72/185; 72/187; 83/29; 83/620
[58] Field of Search ...................... 72/185, 187; 83/29, 83/209, 620

[56] References Cited

U.S. PATENT DOCUMENTS

| | | | |
|---|---|---|---|
| 1,389,878 | 9/1921 | Kraut | 83/620 |
| 2,975,817 | 3/1961 | Neff | 72/185 |
| 3,367,161 | 2/1968 | Avakian | 72/185 |
| 3,397,826 | 8/1968 | Hawley et al. | 83/29 |
| 3,673,906 | 7/1972 | Cash | 83/209 |
| 4,507,948 | 4/1985 | Wallis | 72/187 |
| 4,685,318 | 8/1987 | Ueda et al. | 72/185 |

Primary Examiner—Lowell A. Larson
Attorney, Agent, or Firm—Barnes, Kisselle, Raisch, Choate, Whittemore & Hulbert

[57] ABSTRACT

A machine for corrugating lengths of continuous strip stock that includes first and second sets of corrugation-forming rollers for receiving strip stock from associated coil rolls and feeding corrugating stock to vertically spaced slots in a shared cutting station. Running length of each corrugated strip is measured and the cutting station is controlled so as to obtain severed stock sections of predetermined lengths, which may be variably programmed in a predetermined sequence. The cutting station includes a stationary plate having vertically spaced strip-receiving slots, and a pair of shear blades integrally formed on a shear plate selectively driven by the machine controller through a cycloidal drive mechanism.

43 Claims, 3 Drawing Sheets

APPARATUS FOR CUTTING CORRUGATED STRIP STOCK AT VARIABLE LENGTHS

The present invention is directed to machines for corrugating a continuous length of strip stock to form heat exchanger strips or the like, and more particularly to severing of the continuous strip stock into individual strip lengths.

BACKGROUND AND OBJECTS OF THE INVENTION

Apparatus for manufacture of metalic strips having corrugations extending transversely of strip length are disclosed in U.S. Pat. Nos. 3,998,600, 4,067,219, 4,268,568 and 4,507,948. In general, a continuous length of ribbon or strip stock is fed from a stock coil between one or more pairs of opposed rollers having intermeshing teeth for forming corrugations or fins in the strip stock passing therebetween. The corrugated stock is then fed to a cutting or severing station at which motion of the strip is arrested and the strip is cut to individual lengths. A takeup roller arrangement is positioned between the forming rollers and the cutting station to permit continuous operation of the forming rollers while advancement of the corrugated stock is arrested for cutting. In U.S. Pat. No. 4,507,948, the cutting station comprises a roller having slots formed in the periphery thereof, and a rotary saw blade positioned on the opposite side of the strip stock path. Position sensors detect location of a roller slot opposite the saw blade, at which point motion of the strip stock is arrested, and the saw blade is moved into the opposing roller slot so as to sever the strip stock captured therebetween. Severed strip stock length is thus determined by diameter of the slotted roller and position of the slots and sensors. Any variation in severed stock length requires major readjustment of the forming line and/or replacement of individual components in the line.

It is therefore an object of the present invention to provide a machine of the described character for corrugating a continuous length of strip stock that includes facility for convenient and rapid adjustment of severed stock lengths. Another object of the present invention is to provide a machine of the described character in which severed stock length may be selectively varied during machine operation.

Another important object of the present invention is to provide an improved cutting apparatus, as compared with the saw blade and slotted-roller arrangement of the prior art as described above.

Yet another object of the invention is to provide a machine of the described character for corrugating two continuous lengths of strip stock, for severing such strip stocks at continuously and independently controllable lengths, and for stacking the severed strip lengths so that the stack is of a contour for use in heat exchangers, catalytic convertors and like apparatus of predetermined peripheral geometry. Another more specific object of the invention is to provide a dual strip machine of the described character that is compact in construction, and that occupies about the same shop floor space as do single-strip machines of the prior art.

Yet another object of the present invention is to provide a machine for corrugating continuous lengths of strip stock that satisfies one or more of the foregoing objectives, and yet is economical to fabricate, readily implementable by way of retrofit in corrugation machines previously constructed, and fully automatic in operation.

SUMMARY OF THE INVENTION

The present invention thus contemplates a machine for corrugating one or more continuous lengths of strip stock that includes facility for feeding a continuous length of strip stock between opposed corrugation rollers, and a cutting station positioned to receive the continuous length of corrugated stock from the forming rollers for cutting such corrugated stock into individual stock lengths. In accordance with a first important aspect of the present invention, apparatus for controlling individual strip stock lengths includes a sensor positioned to engage the corrugated strip stock between the forming rollers and the cutting station for measuring running length of corrugated stock fed to the cutting station, and a control mechanism responsive to measured running stock length for energizing the cutting station when running length equals a predetermined or preset length. In the preferred embodiment of the invention, the length-control system includes a programmable controller or the like having facility for receiving and storing a programmed sequence of stock lengths, and for comparing measured running lengths in turn to each of the preprogrammed stock lengths in the sequence. The running length measurement sensor in the preferred embodiment of the invention comprises a roller having teeth positioned to engage corrugations in the continuous length of corrugated stock and a sensor responsive to rotation of the roller for measuring running stock length. Most preferably, the length-measurement roller is coupled to a motor, which in turn is coupled to the controller for arresting travel of the corrugated stock to the cutting station and activating the cutter when such travel is arrested. Thus, the measurement roller in the preferred embodiment of the invention serves the dual functions of selectively feeding and arresting motion of the corrugated stock strip to the cutting station, and measuring running length of the corrugated strip fed to the cutting station.

In accordance with a second aspect of the present invention, the cutting station comprises a plate having a slot for receiving the continuous running length of corrugated stock, a shear knife or blade positioned adjacent to the slot and mounted for motion on the plate transversely of the slot, and a blade drive mechanism coupled to the controller for selectively reciprocating the shear blade over the stationary plate so as to engage and sever stock extending through the plate slot. In the preferred embodiment of the invention, the shear blade forms an integral part of a shear plate resiliently urged against a flat bearing surface on the stationary plate and guided by rollers carried by the stationary plate for controlled motion transverse to the axis of the plate slot. The shear-drive mechanism in the preferred embodiment of the invention comprises an electric motor selectively energizable by the machine controller. The motor is coupled to the shear plate through a cycloidal drive mechanism for controlled acceleration, velocity and deceleration during motion of the shear blade.

In accordance with yet another aspect or feature of the present invention, the forming machine includes first and second independently controllable forming lines with separate stock feeding and corrugating stations positioned in vertically superimposed relationship such that the continuous corrugated strip lengths are vertically spaced and superimposed at a common cutting station. The cutting station preferably includes a stationary plate as previously described having vertically spaced horizontally oriented strip-receiving slots. The shear plate has a pair of integral horizontally-oriented blades respectively positioned adjacent to the associated slots, so that activation of the shear plate simultaneously severs lengths of stock from both the first and second strips. The severed strip lengths thus fall by gravity and are automatically stacked beneath the cutting station. Most preferably, the first and second machine lines include facility for forming corrugations of differing pitch and height, and each line includes facility for independently measuring and controlling severed strip lengths in respective preprogrammed sequences as previously described.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
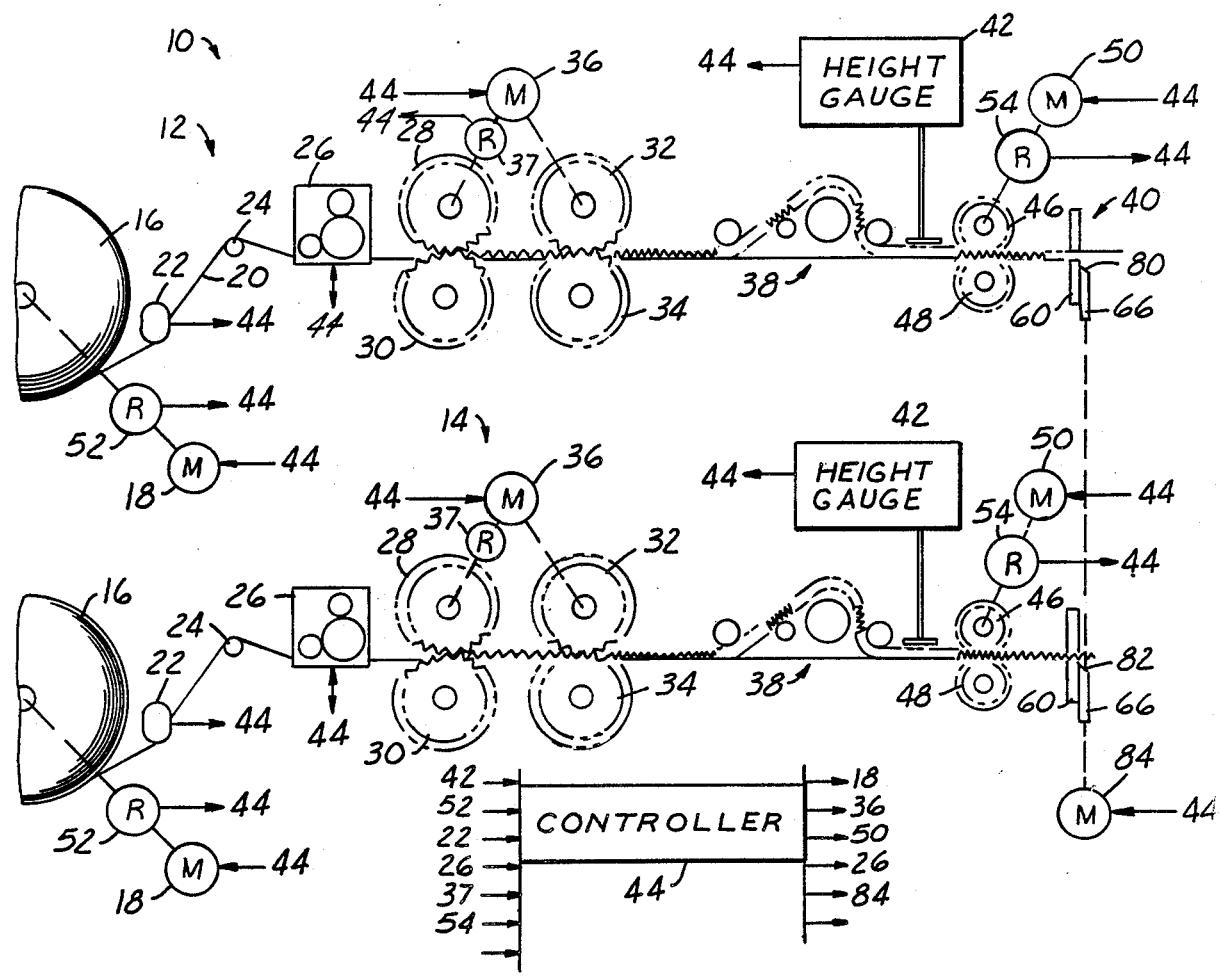
FIG. 1 is a schematic diagram of a strip corrugation machine in accordance with a presently preferred embodiment of the invention.

FIG. 1 illustrates a machine 10 for corrugating continuous lengths of strip stock as comprising first and second vertically spaced and superimposed forming lines 12, 14. Line 12 includes a coil or roll 16 of strip stock suitably mounted and driven by a motor 18 for feeding a continuous length of strip stock 20 over a roller carried by a dancer arm mechanism 22, over an idler roller 24 and through a strip tensioning station 26 to a corrugating station that includes opposed pairs of corrugating rollers 28, 30, and 32, 34. Rollers 28, 32 are jointly driven by a motor 36 for forming a continuing series of transverse fins or corrugations in stock 20, with corrugation pitch and height being determined by contour of and separation between the forming rollers, tension applied at station 26, strip speed and other variables. A motion sensor, preferably a resolver, is coupled to motor 36.

The continuous length of corrugated strip stock is fed over a series of rollers at a slack take-up station 38, and thence to a cutting station 40. A height gauge 42 is positioned between take-up station 38 and cutting station 40 for measuring height of corrugations formed in strip stock 20, and for feeding an appropriate height-measurement signal to a machine controller 44. A pair of rollers 46, 48 oppositely engage the corrugated strip stock downstream of height gauge 42—i.e., between height gauge 42 and cutting station 40. Roller 46 is driven by a motor 50, which in turn is coupled to controller 44 for selectively arresting motion of the strip stock during a severing operation at cutting station 40. Motors 18, 36 are likewise coupled to controller 44. A motion sensor 52, preferably a resolver, is coupled to motor 18 for supplying signals to controller 44 as a function of velocity of rotation of motor 18 and coil 16. Dancer arm mechanism 22 includes a rotary position sensor for feeding signals to controller 44 as a function of dancer arm position. Tension mechanism 26 includes a clutch driven by controller 44 for selectively and controllably applying tension to strip stock 20 passing therethrough, and a sensor for feeding back to controller 44 a signal indicative of tension actually applied to the strip stock.

To the extent thus far described, corrugation line 12 is substantially as disclosed in U.S. Pat. Nos. 4,507,948 and 4,753,096, and in copending U.S. application Ser. No. 180,174 filed Apr. 11, 1988, all of which are assigned to the assignee hereof and the disclosures of which are incorporated herein by reference. U.S. Pat. No. 4,753,096 discloses in detail that feature of line 12 embodied in height gauge 42, controller 44 and tension station 26 for automatically monitoring height of corrugations formed by rollers 28-34 and controlling such height as a function of tension applied to strip stock 20 upstream of the forming rollers The noted copending application is directed in particular to that feature of line 12 embodied in controller 44, dancer arm 22, coil drive motor 18 and sensor 52, and corrugation roller motor 36 and sensor 37 for driving coil 16 as a function of overall machine speed. Strip-forming line 14 is substantially identical to line 12, and corresponding elements in lines 12 and 14 are indicated by identical reference numerals in FIG. 1 for purposes of convenience and clarity. It will be understood, however, that the measurement and control variables thus far described in conjunction with line 12 are independently variable and controllable by controller 44 in line 14.

Figure 3:
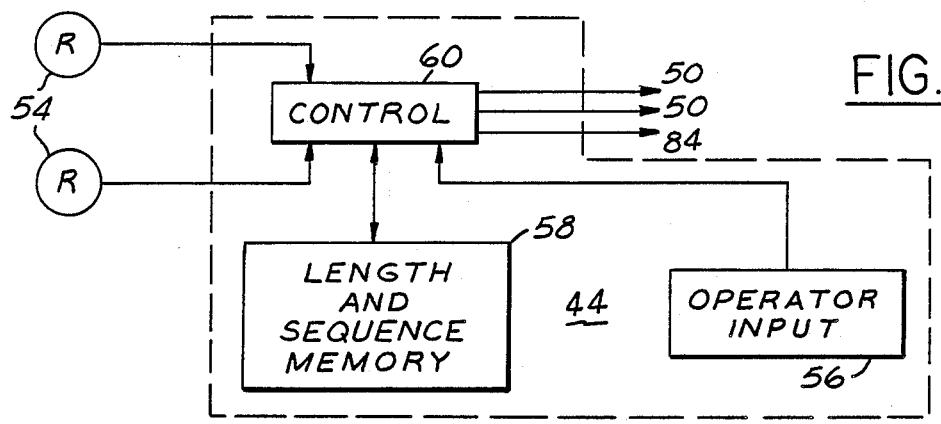
FIG. 3 is a fragmentary functional block diagram illustrating the severed strip length-control feature implemented in the embodiment of FIG. 1.

In accordance with the first important feature of the present invention summarized above, lengths of corrugated strip stock severed at cutting station 40 are individually measured and controlled in each machine line 12, 14. Specifically, a rotary position sensor 54, preferably a resolver, is coupled to each motor 50 for feeding signals to controller 44 as a function of rotation of the associated rollers 46. Rollers 46 preferably comprise gears having teeth which engage and intermesh with corrugations in strip stock passing therepast, so that rotation of rollers 46 and resolvers 54 provide to controller 44 accurate measurements of running strip stock lengths. As shown in FIG. 3, controller 44 preferably includes an operator input mechanism 56, such as an alphanumeric keypad or the like, for entering data into the memory 58 of the controller, and microprocessor-based control circuitry 60 having substantial associated memory 58 and suitable programming for implementing all of the control functions herein described.

Specifically, memory 58 includes facility for storing a sequence of desired stock lengths preprogrammable through input 56 independently for each machine line 12, 14. Control circuitry 60 includes corresponding facility for comparing running lengths of corrugated strip stock fed to cutting station 40, as measured by resolvers 54 and rollers 46, and for arresting motion at motors 50 and activating cutting station 40 (common to both lines 12, 14 as illustrated in FIG. 1) when lengths of corrugated strip stock fed to the cutting station in each line correspond to the preprogrammed lengths stored in sequence at memory 58. Thus, as previously noted, corrugated stock length is measured in each line 12, 14, and the cutting or severing operation is controlled, for selectively and variably obtaining severed stock sections of any length and sequence. It will thus be appreciated in accordance with an important advantage of the preferred embodiment of the invention that rollers 46 serve the dual purpose of feeding and arresting corrugated strip stock to the cutting station, and also of measuring running corrugated stock length through sensors 54.

Figure 4:
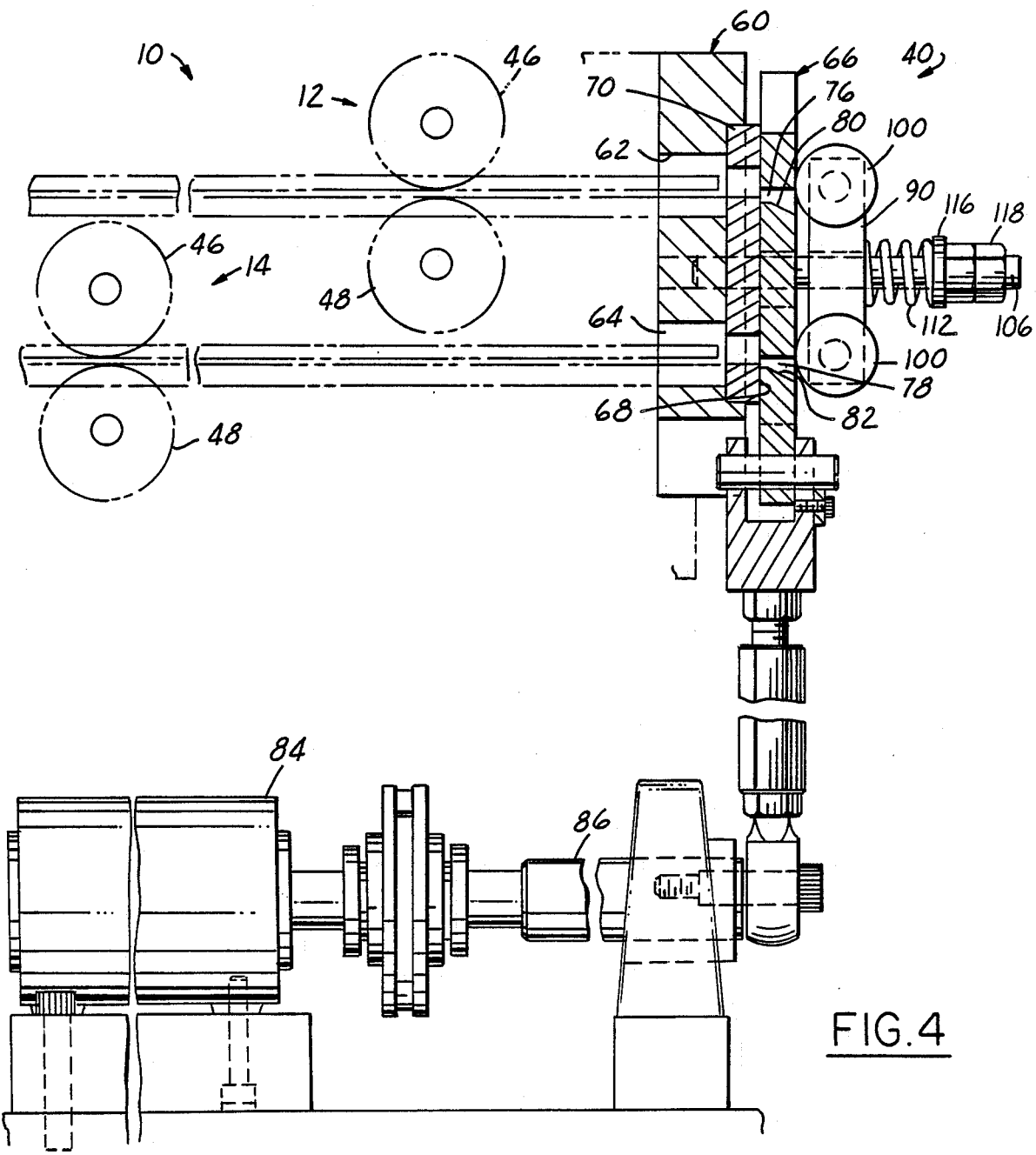
FIG. 4 is a fragmentary sectional view in side elevation of the stock cutting or severing station in the preferred embodiment of the invention illustrated in FIG. 1.
Figure 5:
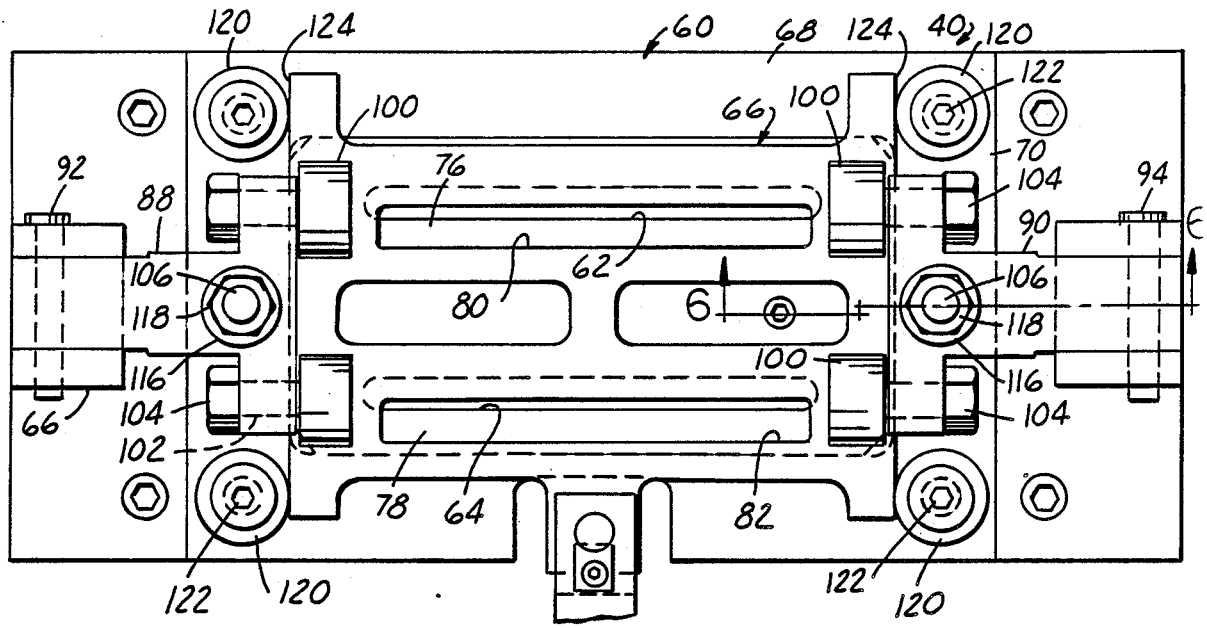
FIG. 5 is an end elevational view of the cutting station illustrated in FIG. 4.
Figure 6:
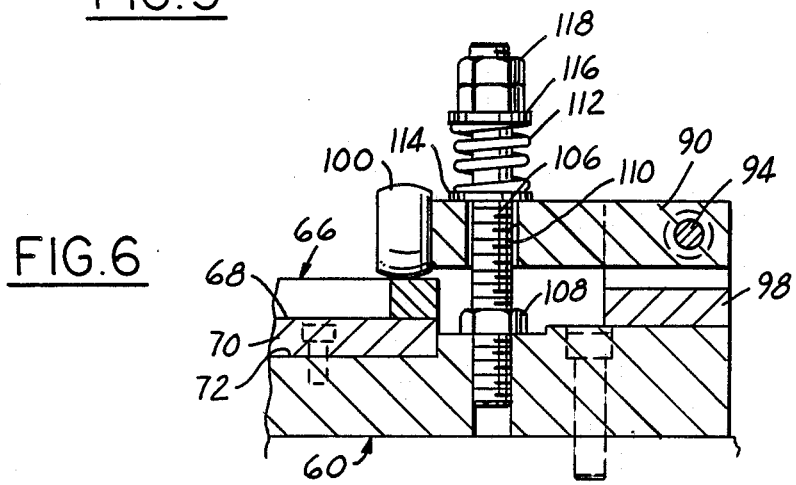
FIG. 6 is a fragmentary sectional view taking substantially along the line 6—6 in FIG. 5.

In accordance with a second important aspect of the present invention summarized above, cutting station 40, which is illustrated schematically in FIG. 1 and in greater detail in FIGS. 4–6, comprises a plate 60 stationarily positioned at the end of each forming line 12, 14, preferably in vertical orientation perpendicular to the generally horizontal planes of running lengths of corrugated strip stock fed to the cutting station. Stationary plate 60 includes a pair of vertically spaced slots 62, 64 having longitudinal dimensions extending transversely of the respective forming lines, and being dimensioned and positioned to receive corrugated strip stock fed therethrough by respective rollers 46, 48 (FIG. 1). A shear plate 66 slideably engages the flat bearing surface 68 of a plate 70 affixed to the outboard face 72 of stationary plate 60. Shear plate 66 has a pair of slots 76, 78 which normally register with slots 62, 64 in stationary plate 60. The beveled lower edges 80, 82 (FIGS. 4 and 5) of shear plate slots 76, 78 form shearing edges for severing engagement with strip stock in stationary plates slots 62, 64 when shear plate 66 is driven upwardly (in the orientation of FIGS. 1, 4 and 5). For driving purposes, shear plate 66 is coupled to a drive motor 84 (FIGS. 1 and 4) through an eccentric cycloidal drive mechanism 86.

A pair of arms 88, 90 are mounted by respective pivot pins 92, 94 to stanchions 96, 98 upstanding from the outboard or downstream face of stationary plate 60 laterally outwardly or respective side edges 124 of shear plate 66. Each arm 88, 90 is generally T-shaped as viewed in end elevation (FIG. 5), and carries a pair of vertically spaced roller bearings 100 fastened at the free ends of arms 88, 90 by the bolts 102 and the nuts 104. A pair of studs 106 are adjustably threadably received on stationary plate 60 laterally outwardly of shear plate side edges 124, and are affixed to plate 60 by the jam nuts 108 (FIG. 6). Each stud 106 extends outwardly from stationary plate 60 through an aperture 110 (FIG. 6) centrally positioned in associated arm 88, 90. A coil spring 112 is captured in compression around each stud 106 between a first washer 116 and a second washer 114 that engages the outboard surface of the associated arm 88, 90. A pair of jam nuts 118 are threaded onto each stud 106 outwardly of washer 116 for selectively adjusting compressive forces of springs 112. Roller bearings 100 engage the outboard face of shear plate 66 adjacent to the lateral side edges thereof, so that the several springs 112 collectively urge shear plate 66 against bearing surface 68. Two pair of roller bearings 120 are affixed by suitable screws 122 to stationary plate 60 laterally outwardly of shear plate 66 and engage parallel side edges 124 of the shear plate for guiding vertical motion of the shear plate as driven by motor 84 and cycloidal drive 86.

Figure 2:
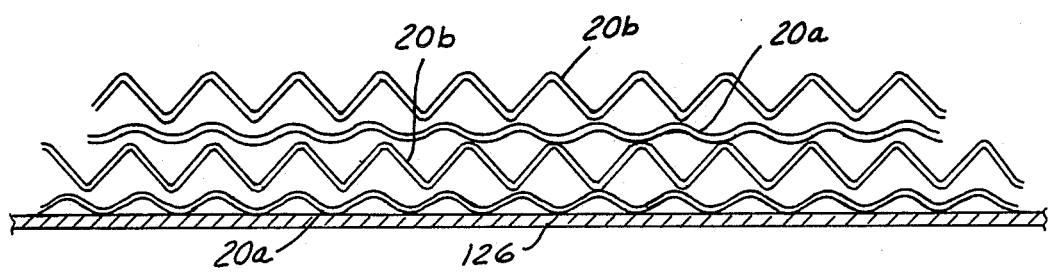
FIG. 2 is a schematic diagram of a stack of severed corrugated stock lengths obtained in operation of the machine of FIG. 1.

Thus, in accordance with this feature of the present invention, corrugated stock lengths are simultaneously severed in both of the forming lines 12, 14. Such stock lengths fall by gravity onto a collection surface 126 (FIG. 2) so as to be automatically stacked. In the example of FIG. 2, the corrugated stock lengths 20a formed in line 44 have convolutions of lesser height and pitch as compared with the stock lengths 20b formed in line 12. Likewise, as previously noted, stock lengths may be controlled in any desired sequence, so that in the example of FIG. 2, the first pair of stock lengths on collection surface 126 are of longer dimension than are the second pair of stock lengths. Thus, the length-wise contour of the stack of stock lengths may be controlled to correspond with any desired peripheral contour of the structure into which the stock lengths are to be mounted in a later operation.

There has thus been described a preferred embodiment of the present invention which embodies several aspects or features which advantageously function individually and in cooperation to satisfy all of the objects and aims previously set forth.

The invention claimed is:

1. In a machine for corrugating a continuous length of strip stock that includes means for feeding a continuous length of strip stock in a continuous uninterrupted motion, opposed corrugation roller means positioned to receive strip stock therebetween from said feeding means for forming corrugations in said stock, means for cutting said corrugated stock into individual stock lengths, and apparatus positioned to receive corrugated stock from said roller means in said continuous uninterrupted motion for periodically arresting motion of the stock and for controlling lengths of stock severed by said cutting means comprising:
   a measurement roller having teeth positioned to engage corrugations in said corrugated stock between said roller means and said cutting means,
   means responsive to rotation of said measurement roller for measuring running length of corrugated stock fed to said cutting means,
   a motor coupled to said measurement roller for selectively driving corrugated stock engaged by said roller toward said cutting means,
   means responsive to said measuring means for simultaneously energizing said cutting means and de-energizing said motor when said running length equals a predetermined length so as to arrest motion of said corrugated stock when said cutting means is activated, and
   slack take-up means positioned between said roller means and said measurement gear for taking up slack in said corrugated stock fed through said roller means in said continuous uninterrupted motion while motion of said corrugated stock is arrested at said measurement roller.

2. The machine set forth in claim 1 wherein said apparatus further comprises means for selectively varying said predetermined length.

3. The machine set forth in claim 2 wherein said selectively-varying means comprises programmable control means including means for receiving and storing a programmed sequence of said differing predetermined lengths, and means for comparing said running length in turn to each said predetermined length in said sequence.

4. The machine set forth in claim 1 wherein said measuring means further comprises a position sensor coupled to said motor and said roller.

5. The machine set forth in claim 1 comprising first and second means for feeding continuous first and second lengths of strip stock, first and second opposed corrugation roller means respectively positioned to receive strip stock from said first and second feeding means, first and second means for cutting corrugated stock from said first and second roller means, means for measuring running length of each corrugated strip length, and means for energizing said first and second cutting means substantially simultaneously.

6. The machine set forth in claim 6 wherein said cutting means comprises a stationary plate having vertically spread slots for respectively receiving said first and second lengths, shear means including a blade adjacent to each said slot, means mounting said shear means for motion on said plate, and means for selectively reciprocating said shear means over said plate so that said blades engage stock lengths in said slots.

7. The machine set forth in claim 1 wherein said cutting means comprises: a stationary plate having a slot for receiving said corrugated stock, shear means including a blade positioned adjacent to said slot, means mounting said shear means for motion on said plate transversely of said slot, and means for selectively reciprocating said shear means over said plate so that said blade engages stock in said slot.

8. The machine set forth in claim 7 wherein said shear means comprises a shear plate having said shear blade integrally formed as part thereof.

9. The machine set forth in claim 8 wherein said stationary plate has a flat bearing surface remote from said roller means, and wherein said cutting means further includes means mounting said shear plate for reciprocal sliding motion on said bearing surface.

10. The machine set forth in claim 9 wherein said mounting means includes means resiliently urging said shear plate against said bearing surface.

11. A machine for corrugating first and second continuous lengths of strip stock comprising:
means for feeding separate first and second continuous lengths of strip stock,
first and second opposed corrugation roller means respectively positioned to receive strip stock from said first and second feeding means for forming corrugations in said first and second stock lengths, and
means positioned to receive corrugated stock from said first and second roller means for selectively and substantially simultaneously cutting and first and second stock lengths into individual stock lengths,
said feeding and forming means being positioned in vertically superimposed forming lines such that said first and second continuous corrugated stock lengths are vertically spaced at said cutting means.

12. The machine set forth in claim 11 wherein said cutting means comprises a stationary plate having vertically spread slots for respectively receiving said first and second lengths, shear means including a blade adjacent to each said slot, means mounting said shear means for vertical motion on said plate, and means for selectively reciprocating said shear means over said plate so that said blades engage stock lengths in said slots.

13. The machine set forth in claim 12 wherein said shear means comprises a shear plate having said shear blades integrally formed as part thereof.

14. The machine set forth in claim 13 wherein said stationary plate has a flat bearing surface remote from said forming means, and wherein said cutting means further includes means mounting said shear plate for reciprocal sliding motion on said bearing surface.

15. The machine set forth in claim 14 wherein said mounting means includes means resiliently urging said shear plate against said bearing surface.

16. The machine set forth in claim 15 wherein said resiliently-urging means comprises a pair of bearing arms pivotally mounted on said stationary plate at opposed lateral sides of said shear plate, roller bearings carried by each said arm in rolling engagement with a surface of said shear plate remote from said bearing surface, a stud mounted on said stationary plate adjacent to each said bearing arm, and a coilspring carried by each said stud in resilient compressive engagement with an associated bearing arm.

17. The machine set forth in claim 16 further comprising means for adjusting spring force at each said spring.

18. The machine set forth in claim 17 wherein said selectively-reciprocating means comprises an electric motor and cycloidal drive means coupling said motor to said shear plate.

19. The machine set forth in claim 15 further comprising means carried by said stationary plate on opposite lateral sides of said shear plate for guiding cutting motion of said shear plate.

20. The machine set forth in claim 19 wherein said motion guiding means comprises parallel side edges on said shear plate, and roller bearings carried by said stationary plate in rolling engagement with said side edges.

21. The machine set forth in claim 11 further comprising first and second means respectively positioned between said first and second roller means and said cutting means in engagement with said first and second strips for measuring running lengths of said first and second strips fed to said cutting means, and means responsive to said measuring means for energizing said cutting means when said running lengths equal first and second predetermined lengths.

22. The machine set forth in claim 21 wherein said first and second predetermined lengths are substantially equal.

23. The machine set forth in claim 22 wherein said first and second roller means are constructed and arranged to form corrugations having differing dimensional characteristics.

24. The machine set forth in claim 22 wherein said apparatus further comprises programmable control means including means for receiving and storing a programmed sequence of said predetermined lengths, and means for comparing said running length to each said predetermined length in turn in said sequence.

25. A machine for corrugating first and second lengths of strip stock that includes:
first and second means for feeding continuous first and second lengths of strip stock,
first and second opposed corrugation roller means respectively positioned to receive strip stock therebetween from said first and second feeding means for forming corrugations in said stock,
first and second cutting means positioned to receive corrugated stock from respective said roller means for cutting said stock into individual lengths, and
apparatus for controlling length of individual stock lengths comprising:
means positioned to engage each corrugated stock strip between each said roller means and the associated cutting means for measuring running length of the associated corrugated stock strip, and means responsive to said measuring means for energizing said first and second cutting means substantially simultaneously when said running lengths equal associated predetermined lengths, said cutting means comprising a stationary plate having vertically spaced slots for respectively receiving said first and second lengths, shear means including a blade adjacent to each said slot, means mounting said shear means for motion on said plate, and means for selectively reciprocating said shear means over said plate so that said blades engage stock lengths in said slots.

26. The machine set forth in claim 25 wherein each said measuring means comprises measurement roller means positioned to engage said corrugated stock, and means responsive to rotation of said measurement roller means for measuring said running length.

27. The machine set forth in claim 26 wherein each said measurement roller means comprises a gear having teeth positioned to engage corrugations in said corrugated stock.

28. The machine set forth in claim 26 wherein said apparatus further comprises means for arresting travel of the corrugated stock strips to said cutting means, and means for selectively controlling said motion-arresting means and said cutting means such that motion of said corrugated stock is arrested when said cutting means is activated.

29. The machine set forth in claim 28 wherein said motion-arresting means comprises a motor coupled to each said measurement roller, said measurement rollers serving the dual functions of selectively feeding and arresting motion of the corrugated stock strips to said cutting means, and measuring length of corrugated stock fed to said cutting means.

30. The machine set forth in claim 25 wherein said stationary plate has a flat bearing surface remote from said forming means, and wherein said cutting means further includes means mounting said shear means for reciprocal sliding motion on said bearing surface.

31. The machine set forth in claim 11 wherein said selectively-reciprocating means comprises an electric motor and cycloidal drive means coupling said motor to said shear means.

32. A machine for corrugating a continuous length of strip stock that includes means for feeding a continuous length of strip stock, opposed corrugation roller means positioned to receive strip stock therebetween from said feeding means for forming corrugations in said stock, and means positioned to receive corrugated stock from said roller means for cutting said corrugated stock into individual stock lengths; characterized in that said cutting means comprises:

a stationary plate having a slot for receiving said corrugated stock and a flat bearing surface remote from said roller means, shear means including a shear plate having a shear blade integrally formed as part thereof positioned adjacent to said slot, means mounting said shear plate for reciprocal sliding motion on said bearing surface transversely of said slot, means resiliently urging said shear plate against said bearing surface, and means for selectively reciprocating said shear means over said plate so that said blade engages stock in said slot.

33. The machine set forth in claim 32 wherein said selectively-reciprocating means comprises an electric motor and cycloidal drive means coupling said motor to said shear means.

34. The machine set forth in claim 32 wherein said apparatus further comprises means for arresting travel of the corrugated stock to said cutting means, and means for selectively controlling said motion-arresting means and said cutting means such that motion of said corrugated stock is arrested when said cutting means is activated.

35. The machine set forth in claim 32 wherein said resiliently-urging means comprises a pair of bearing arms pivotally mounted on said stationary plate at opposed lateral sides of said shear plate, roller bearings carried by each said arm in rolling engagement with a surface of said shear plate remote from said bearing surface, a stud mounted on said stationary plate adjacent to each said bearing arm, and a coil spring carried by each said stud in resilient compressive engagement with an associated bearing arm.

36. The machine set forth in claim 35 further comprising means for adjusting spring force at each said spring.

37. The machine set forth in claim 32 further comprising means carried by said stationary plate on opposite lateral sides of said shear plate for guiding cutting motion of said shear plate.

38. The machine set forth in claim 37 wherein said motion-guiding means comprises parallel side edges on said shear plate, and roller bearings carried by said stationary plate in rolling engagement with said side edges.

39. The machine set forth in claim 32 further comprising means positioned to engage said corrugated strip stock between said roller means and said cutting means for measuring running length of corrugated stock fed to said cutting means, and means responsive to said measuring means for energizing said cutting means when said running length equals a predetermined length.

40. The machine set forth in claim 39 wherein said apparatus further comprises programmable control means including means for receiving and storing a programmed sequence of said predetermined lengths, and means for comparing said running length to each said predetermined length in turn in said sequence.

41. The machine set forth in claim 39 wherein said measuring means comprises measurement roller means positioned to engage said corrugated stock, and means responsive to rotation of said measurement roller means for measuring said running length.

42. The machine set forth in claim 39 wherein said apparatus further comprises means for arresting travel of the corrugated stock to said cutting means, and means for selectively controlling said motion-arresting means and said cutting means such that motion of said corrugated stock is arrested when said cutting means is activated.

43. The machine set forth in claim 42 wherein said motion-arresting means comprises a motor coupled to said measurement roller, said measurement roller serving the dual functions of selectively feeding and arresting motion of the corrugated stock to said cutting means, and measuring length of corrugated stock fed to said cutting means.

* * * * *